Sept. 19, 1950     R. C. SWEET     2,523,075
GRAVIMETER

Filed April 30, 1946     2 Sheets-Sheet 1

REGINALD C. SWEET
INVENTOR

BY *J. Vincent Martin*
*Ralph R. Browning*
*James C. Simms*
ATTORNEYS

Sept. 19, 1950  R. C. SWEET  2,523,075
GRAVIMETER
Filed April 30, 1946  2 Sheets-Sheet 2

REGINALD C. SWEET
INVENTOR.

BY J. Vincent Martin
Ralph R. Browning
James B. Simms
ATTORNEYS

Patented Sept. 19, 1950

2,523,075

UNITED STATES PATENT OFFICE 2,523,075

GRAVIMETER

Reginald C. Sweet, Houston, Tex., assignor to North American Geophysical Company, Houston, Tex., a corporation of Texas Application April 30, 1946, Serial No. 665,935

10 Claims. (Cl. 73—382)

This invention relates to improvements in gravimeters and refers more particularly to the balancing and reading of gravimeters to determine variations in the force of gravity.

The instrument has to do with the determination of the acceleration of gravity at different localities. This information has proven helpful in locating mineral deposits, oil and the like. In this work the variations usually encountered from place to place are of extremely small magnitudes and the accuracy of their determinations is effected by slight errors inherent in known gravimeters and their mode of operation. While these instruments must be very sensitive, nevertheless due to the usual operating conditions in field use, ruggedness in the instruments is desirable.

One of the principal difficulties heretofore encountered has been the non-linearity of the balancing system. Also very sensitive balancing means have been used to place the instrument in equilibrium from which the gravity variations are determined. These sensitive mechanisms have not stood up satisfactorily in use. In addition, the known gravimeters of the null reading type require a critical leveling operation to insure absolute leveling of the beam at the null reading point. This is both expensive and time consuming in field operations.

An object of this invention is to provide a sensitive but rugged gravimeter.

Another object is to provide a gravimeter wherein the balancing or nulling mechanism is linear in its function.

A further object is to provide a gravimeter having relatively rugged mechanism for nulling the instrument.

Still another object is to provide a gravimeter of the null reading type wherein the instrument may be nulled without the application of additional forces to the gravity responsive member.

A still further object is to provide a null reading type gravimeter wherein the elastic system is brought to a predetermined condition to null the instrument by a redistribution of the forces of the system and without the application of additional force to the gravity responsive member.

Yet another object is to provide a null reading gravimeter wherein the instrument may be nulled without critical leveling of the gravity responsive member.

Yet a further object is to provide a gravimeter having a gravity responsive member suspended for rotation about a shiftable axis which is nulled by shifting the position of the axis of rotation.

Other and further objects of this invention will appear from the following description:

In the accompanying drawings which form a part of the instant specification and are to be read in conjunction therewith, and wherein like reference numerals are used to indicate like parts in the various views.

Figure 1:
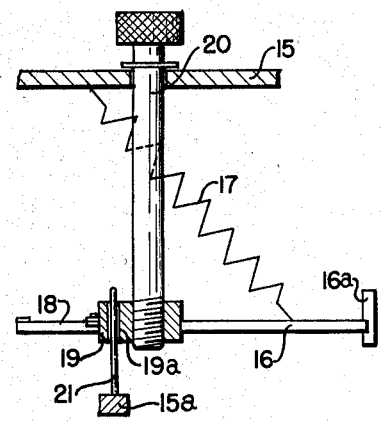
Fig. 1 is a side elevation partially in section of a gravity responsive member and the suspension therefor constituting an embodiment of this invention.
Figure 2:
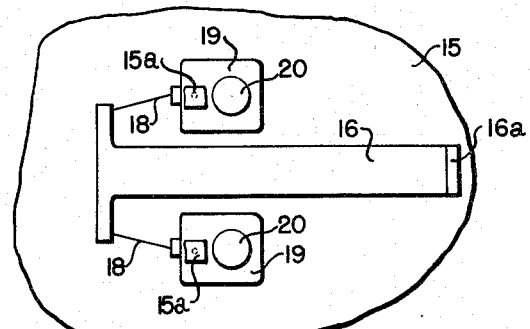
Fig. 2 is a worm's eye view of the instrument of Fig. 1.

Referring to the drawings and more particularly to the simplified showing of Figs. 1 and 2, the numeral 15 designates a support from which is suspended a gravity responsive member or beam 16. The beam is floatingly suspended by an elastic system. The elastic system comprises the elastic member 17 which may be a coil spring preferably of the zero-length type, flexible but inextensible strands or wires 18, and clamping blocks 19.

The beam carries a weight 16a at one end and the coil spring 17 is preferably attached to the beam at its center of gravity. The wires 18 are clamped to the unweighted end of the beam and the blocks 19. Clamping blocks 19 are carried by support 15 through rods 20 journaled in support 15. The rods have knurled thumb screws at one end and threaded engagement with blocks 19 at the other end. Guide rods 21 attached to the support at 15a extend through openings or guideways 19a in blocks 19 to prevent rotation of the blocks with rods 20. Thus the clamping blocks may be raised or lowered to vary the position of the end of the wires 18 anchored thereto by rotation of rods 20.

The suspension of beam 16 is such that variations in the acceleration of gravity result in rotation of the beam about a shiftable horizontal axis. This axis is on a line with the ends of wires 18 anchored in blocks 19, and is shifted by adjustment of blocks 19.

In the interest of simplicity, a means for determining when the beam is in a null position and the means for taking readings of the instrument is dispensed with in the embodiments illustrated in Figs. 1 and 2. However, a preferred embodiment of the invention in which suitable means of this type are illustrated is shown in Figs. 7 to 10 inclusive and will be more fully hereinafter described.

With regard to the method of balancing or reading the variation of gravity forces according to the invention, the underlying theory of this type of gravimeter with regard to stability conditions will be reviewed. In use the null reading method is preferred, that is the elastic member is always returned to a predetermined position. According to this invention this is accomplished by a change in geometry of the system to redistribute the forces of the system without the use of auxiliary means of exerting a minor force on the gravity responsive member. This is done by varying the position of the axis of rotation of the gravity responsive member. In this connection the diagrams of Figs. 3 to 5 inclusive are referred to for a mathematical illustration of the mode of nulling the instrument.

To illustrate the theory all forces exerted against the beam or gravity responsive member will be resolved into torques about the axis of rotation of the gravity responsive member. The condition for stability is that the algebraic sum of all these forces equals zero for a given position of equilibrium. In the figures last referred to a schematic showing of the geometry of essential parts of the system are illustrated. In the following mathematical discussion:

$a$ = distance between pivot axis and upper main spring support,
$b$ = distance from pivot to point of attachment of main spring to beam,
$c$ = distance of pivot to weight,
$\theta$ = angle the beam makes with the vertical, and
$B$ = angle the upper portion of spring axis makes with the vertical.

Figure 3:
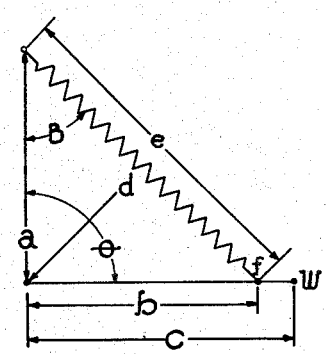
Fig. 3 is a schematic view showing the geometry of the operating parts of the instrument of Fig. 1.

In Fig. 3, at the end of arm C is a weight W which is equal to $Mg$ where $M$ = mass of weight
$g$ = acceleration of the earth's gravity force.

The torque produced about the axis, due to this weight, is:

$$T_g = -Wc \sin \theta \qquad (1)$$

This torque force acts in a clockwise direction and therefore is negative according to the usual convention.

Remembering that by definition the force of a zero-length spring is directly proportional to the distance between its points of attachment, the force it exerts is:

$$F_s = ke \qquad (2)$$

where
$k$ = spring constant
$e$ = distance between attachments.

The torque of this force about the axis is:

$$T_s = ked \qquad (3)$$

where $d$ is the effective lever arm of the spring force.

The direction of this torque is counterclockwise and is designated as positive.

By geometry and sine law $$e = \frac{b \sin \theta}{\sin B}$$

and $$d = a \sin B$$

Therefore:

$$T_s = kab \sin \theta \qquad (4)$$

The total torque about the axis is:

$$T_0 = T_s + T_g = kab \sin \theta - Wc \sin \theta$$

where $T_0$ = total torque.

For the system to be in a state of equilibrium $$T_0 \text{ must} = 0 \text{ or } kab \sin \theta = Wc \sin \theta \qquad (5)$$

It will be assumed that the gravimeter has been balanced at one location of known gravity force as illustrated in Fig. 3. It will now be illustrated how the difference in gravity force at another location is measured according to this invention.

Figure 4:
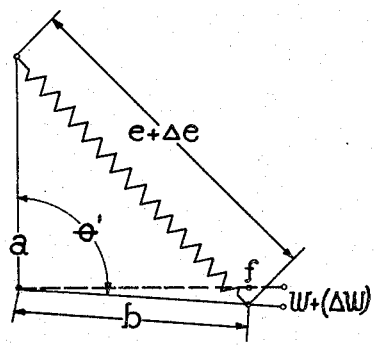
Fig. 4 is a view similar to Fig. 3 illustrating the geometry of the device of Fig. 1 where the acceleration of gravity is increased.

The meter is moved to a new location where, due to change in acceleration of gravity, the weight has become $W + (\Delta W)$, where $(\Delta W)$ is a small change in the weight value. If the beam is allowed to move without restriction, this force would elongate the elastic member whose new length would become $e + (\Delta e)$, where $(\Delta e)$ is the increase in length of spring and angle $\theta$ become angle $\theta'$, as shown in Fig. 4.

As it is undesirable because of hysteresis to unduly stress the spring, this may be prevented by use of stops to limit rotation of the gravity responsive member as is well known to those skilled in the art. The spring is then brought back to its original position or condition by moving the axis of rotaton of the beam at the lower terminus of "$a$" to a new point $(\Delta a)$ below the original terminus of "$a$." This will increase the turning moment of the spring, as is readily seen from Equation 5. This is true for the reason that the value of "$a$" has become $a + (\Delta a)$ and angle $\theta'$, which has become greater than 90° is decreased, thus increasing the value of the sine of the angle. In operation the axis of rotation of the beam is adjusted until the reading telescope has indicated that the point of attachment of the spring has returned to point "$f$," which indicates that the spring has been restored to its original condition.

Figure 5:
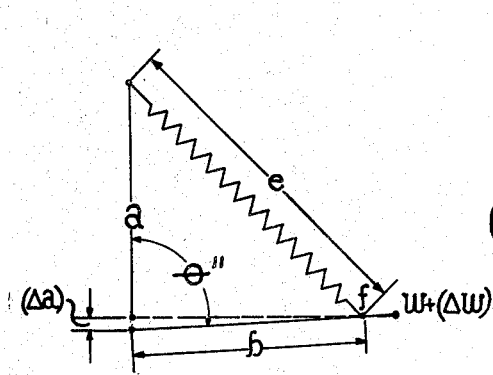
Fig. 5 illustrates the geometry of the device with the instrument nulled.

This new stable condition is illustrated in Fig. 5 and the condition for stability is:

$$[a+(\Delta a)]kb \sin \theta'' = [W+(\Delta W)] c \sin \theta'' \qquad (6)$$

It is to be noted that the angle $\theta$ has taken on a new value $\theta''$. The value of this angle, however, is of no moment, as $\theta''$ appears on both sides of the equation and can be cancelled out, leaving:

$$akb + (\Delta a)kb = Wc + (\Delta W)c \qquad (7)$$

which solved for $(\Delta W)$ becomes $$(\Delta W) = \frac{akb}{c} - W + \frac{kb}{c}(\Delta a) \qquad (8)$$

Every element in the right hand portion of Equation 8 is a constant except $(\Delta a)$. Each of the constant elements existed in the original condition of balance as indicated by Equation 5 and is unchanged in Equation 8. In other words, the only change required to bring about a suitable balance is $(\Delta a)$. This change is purely geometrical. No new forces have been introduced into the system other than the change in gravitational forces which are measured. The nulling of the instrument is accomplished by a redistribution of the existing restoring forces to bring the system into balance or equilibrium with the elastic member in its original condition of stress.

Figure 6:
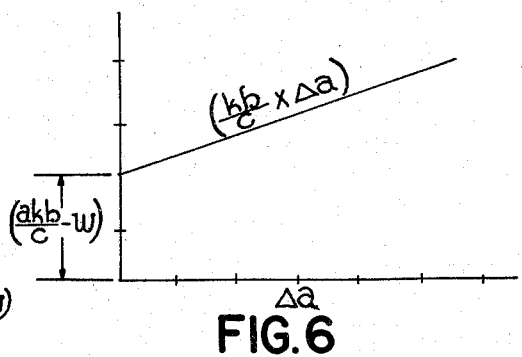
Fig. 6 is a curve illustrating the linearity of the balancing mechanism of the instrument shown in Fig. 1.
Figure 7:
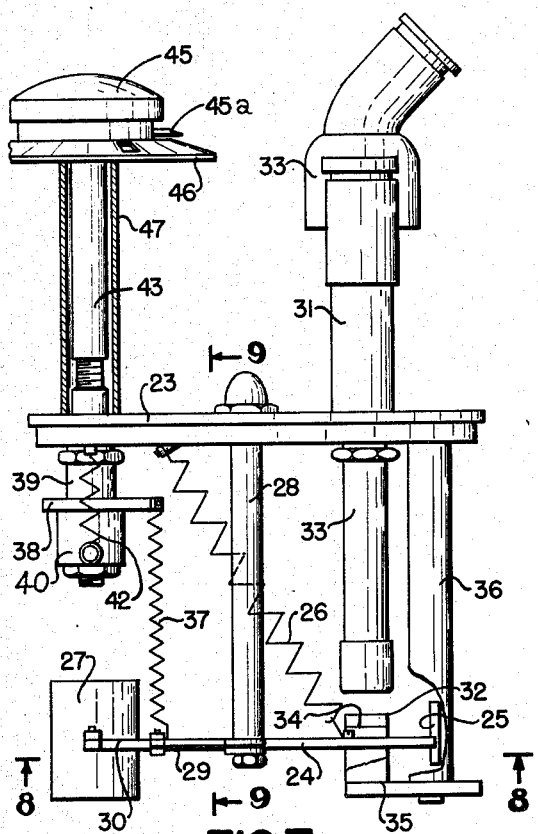
Fig. 7 is a side elevation of an instrument constituting a preferred embodiment of this invention.

Another important conclusion to be drawn from Equation 8 is that the equation is linear. A constant rate of proportionality exists between $(\Delta a)$ and $(\Delta W)$. This is illustrated in Fig. 6 in the form of a curve. The direct proportionality is indicated by the straight line character of the curve of the chart.

Several advantages are apparent from the foregoing description of the mode of operation of the gravimeter of this invention. These advantages lie in the linearity of the balancing system, the ruggedness of the mechanism for nulling the instrument and the fact that critical leveling of the beam in reading the null point is dispensed with.

The preferred embodiment of the invention as illustrated in Figs. 7 to 10, inclusive, will now be taken up. This embodiment broadly comprises a support for the instrument, a gravity responsive member suspended from the support, a telescope assembly to determine when the instrument is in a nulled position, and a mechanism including an indicator for redistributing the forces on the gravity responsive member in order to null the instrument without the addition of new forces to the system other than the change in gravity.

The support for the instrument comprises a ring 22 supported on legs 22a. The upper support plate 23 is adapted to rest in the ring. This support plate carries the mechanism of this device as will be more fully hereinafter explained. The gravity responsive member or beam 24 has a weight 25 at one end of such character that the center of gravity of the overall beam is adjacent the weight. The main elastic member or coil spring 26 is attached to the beam preferably at its center of gravity. The other end of the spring is fixed to the under side of the upper support plate 23. The spring preferably is one which functions as a zero-length spring. The unweighted end of the beam is in the form of a yoke having arms 24a. These arms support the buoyancy compensator 27. This compensator contrary to its appearance is a light weight shell. The volume of the compensator is such that the buoyancy moment of the gravity responsive member on either side of the axis of rotation of the member are equal. The axis of rotation of the member will be more fully hereinafter discussed.

Figure 8:
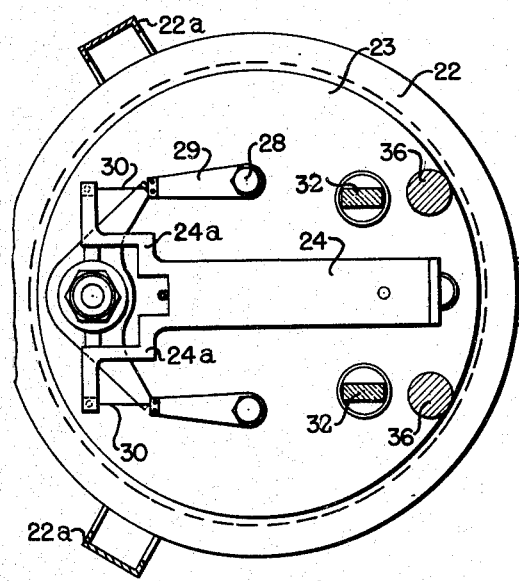
Fig. 8 is a view taken along the line 8—8 in Fig. 7 in the direction of the arrows with the buoyancy compensator removed.
Figure 9:
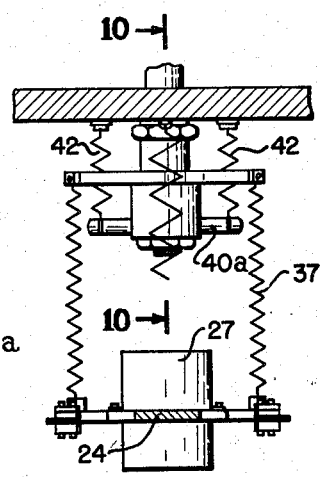
Fig. 9 is a view taken along the line 9—9 in Fig. 7 in the direction of the arrows.

Obviously with the member 24 supported only by the main spring 26, the member would tend to swing into a position wherein the main spring would be vertical. To hold the beam in the position illustrated, posts 28 depending from upper support plate 23 carry leaf springs 29 at their lower ends. These springs, in turn, have clamped in their extended ends one end of wires or strands 30. The other ends of the wires are attached to the ends of the yoke arms 24a as is best shown in Fig. 8. Thus, the leaf springs and associated wires provide inextensible but flexible connections to overcome the horizontal force component of the elastic member 26. This suspension of the gravity responsive member 24 is such that changes in the acceleration of gravity will cause a rotation of the member about a horizontal axis on a straight line struck between the anchorings of wires 30 to springs 29.

The visual or telescope assembly for determining the state of balance of the gravity responsive member 24 comprises a lamp tube 31 which houses a source of light not shown in the drawing. This tube is positioned above the support plate 23 and casts a beam of light which is reflected by mirrors 32, only one of which is shown in the drawings, to the telescope tube 33. A suitable scale is carried within the telescope tube, the scale having a zero marking. Mirrors 32 are arranged to reflect the beam of light transverse of the plane of rotation of the gravity responsive member 24. Member 24 carries a hair line 34. When member 24 is in the position that the shadow of the cross hair registers with the zero marking of the telescope scale, the instrument is in the zero or null condition. Mirrors 32 are carried by suitable support brackets 35 carried by posts 36 depending from the upper support plate.

The mechanism for nulling the instrument includes an elastic means for varying the vertical position of the wire anchoring ends of leaf springs 29, a means for varying the stress of the elastic system and an indicator for determining this variation. The advantage of this mechanism over that shown in Figs. 1 and 2 is that it provides an amplification of the movement of the axis of rotation of the gravity responsive member encountered in balancing the instrument and is at the same time rugged relative to the balancing spring 26. This amplification is highly desirable due to the extremely small magnitude of these variations in actual operation. The accuracy of the instrument is thus materially increased.

In more detail, the nulling mechanism comprises two vertical coil springs 37 attached at their lower ends to the leaf springs 29, adjacent their attachment with wires 30 and at their other ends to a horizontal plate 38. The level of this plate may be varied to alter the stress on springs 37.

Figure 10:
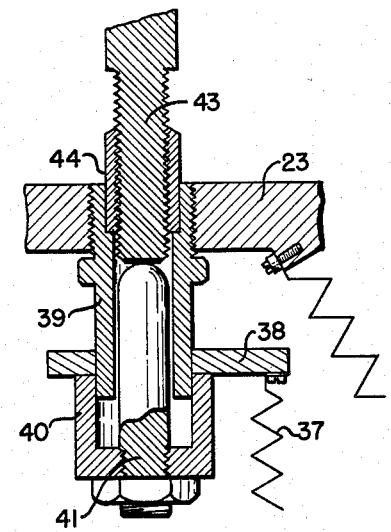
Fig. 10 is a view taken along the line 10—10 in Fig. 9 in the direction of the arrows.

The mechanism for varying the position of plate 38 is best shown in the enlarged detail of Fig. 10. Plate 38 has a substantially central aperture which fits over the lower end of nipple 39 threadedly connected and depending from upper support plate 23. Cup 40 has its upper edge fastened to the lower face of plate 38 and is also slidably mounted over the lower end of nipple 39. A dowel 41 is bolted to the cup and extends within the lower end of nipple 39. Coil springs 42 attached between plate 23 and pins 40a on the cup, urge the cup and horizontal plate 31 upwardly maintaining the upper end of dowel 41 in engagement with the lower end of shaft 43. This shaft has a threaded engagement with boss 44 which is seated in the upper end of nipple 39. At the upper end of shaft 43 is a hand knob 45 carrying a pointer 45a. Obviously rotation of the knob varies the vertical position of shaft 43, dowel 41 and plate 38 effecting an adjustment of the axis of rotation of gravity responsive member 24. The magnitude of this adjustment may be determined by the position of pointer 45a on scale 46 suitably supported by support plate 23 by sleeve 47 encasing shaft 43.

It is contemplated that the instrument may be housed within a suitable casing, which for simplicity is not shown in the drawings, but is well understood by those skilled in the art.

It is believed that the operation of the preferred embodiment is apparent from the foregoing description and the discussion of the operation and geometry of the simplified form of Figs. 1 and 2. The instrument is placed in equilibrium at a base where the acceleration of gravity is known so that the image of the hair line 34 corresponds with the null or zero marking on the telescope scale. The instrument is then moved to a new location and is again nulled by proper adjustment of the hand knob 45 to again bring the image of the hair line in registration with the zero marking of the telescope scale. The amount of adjustment required at the new location is read from the stationary scale 46 and is a function of the variation in the acceleration of gravity between the base and the new location.

The actual variation of the position of the axis of rotation of the gravity responsive member is slight but is materially amplified by use of the leaf springs 29 opposed to the coil springs 37. Both the leaf springs and coil springs are strong and rugged as compared to the balance spring 26 of the device. The coil springs 37 may be several times the strength of spring 26 and the leaf springs may be as much as 100 times as strong as spring 26.

The instrument is nulled without the application of any auxiliary or minor forces on the gravity responsive member.

It will be seen that the objects of this invention have been accomplished. There has been provided a gravimeter having a rugged system for redistributing the forces exerted on the gravity responsive member whereby the instrument is nulled. The arrangement is such that in operation critical leveling of the gravity responsive member is not required. The construction is such that the required variation in the geometry of the system to null the device is amplified to facilitate its determination.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

I claim:

1. In a gravimeter a gravity responsive member and an elastic system supporting said member in equilibrium with gravity in such manner as to provide for rotation of the member about a floating horizontal axis, said elastic system being connected to said gravity responsive member so as to exert a force thereon having both vertical and horizontal components, means for shifting substantially vertically the position of the axis of rotation of the gravity responsive member a determinable amount to null the instrument said means having a part readily available exteriorly of the gravimeter to facilitate nulling of the instrument.

2. A beam type gravimeter comprising a support, an elastic member attached to the beam adjacent one end and to the support, said member exerting a force on said beam having both vertical and horizontal components, adjustable means carried by the support and attached to the beam remote from its attachment with the elastic member for overcoming the horizontal force component of the elastic member whereby the beam is suspended for rotation about a substantially horizontal axis, said means having a part readily available to facilitate vertical shifting of the position of the beam axis of rotation, and calibrated means for determining the amount of shifting of the axis required to null the instrument.

3. An instrument as in claim 2 wherein the axis of rotation of the beam and the attachment of the elastic member to the support are in substantial vertical alignment.

4. A beam type gravimeter comprising a support, means including a substantially zero-length coil spring for floatingly suspending the beam for rotation about a substantially horizontal axis, said spring mounted to exert a force upon the beam having both vertical and horizontal components, and means for varying the vertical position of the axis of rotation of the beam a determinable amount to place the coil spring in a predetermined condition.

5. In a beam type gravimeter having a support, a zero length spring attached to the support and beam, said spring exerting a force on the beam having both horizontal and vertical components, a connection between the support and the beam remote from the spring attachment to the beam for overcoming the horizontal force component of the spring and suspending the beam for rotation about a substantially horizontal axis comprising a clamp carried by the support, said clamp being vertically adjustable, means for determining the amount of vertical adjustment and a strand fastened between the clamp and beam whereby the vertical position of the beam axis may be varied by vertical adjustment of the clamp to bring the elastic member to a predetermined condition.

6. In a beam type gravimeter having a support, a substantially zero length spring attached to the support and beam, said spring exerting a force on the beam having both horizontal and vertical components, a connection between the support and the beam remote from the spring attachment to the beam for overcoming the horizontal force component of the spring and suspending the beam for rotation about a substantially horizontal axis comprising a substantially horizontal leaf spring connected at one end to the support, a strand connecting the other end of the leaf spring to the beam, a vertically adjustable elastic connection between the end of the leaf spring connected to the wire and the support, and means for determining the amount of adjustment of the elastic connection.

7. An instrument as in claim 6 wherein a coil spring constitutes the elastic connection.

8. An instrument as in claim 6 wherein a coil spring constitutes the elastic connection and both the leaf spring and coil spring of the elastic connection are relatively strong as compared with the zero length spring.

9. An instrument as in claim 6 wherein a coil spring constitutes the elastic connection and is relatively weak as compared with the leaf spring.

10. A gravimeter comprising a pivotally supported gravity responsive member with its center of gravity spaced from its pivotal axis, an elastic system connected with the gravity responsive member to exert a force thereon having both vertical and horizontal components and adapted to maintain it in a position with its center of gravity laterally displaced from the vertical through the pivotal axis to provide equal and opposite turning moments about the pivotal axis due to the elastic system and gravity, and means for selectively shifting the pivotal axis substantially vertically a determinable amount whereby when the force of gravity varies, the gravity responsive member may be placed in equilibrium with the elastic system in a predetermined condition and the shifting of the pivotal axis required to accomplish this is a linear function of the variations in gravity.

REGINALD C. SWEET.

REFERENCES CITED

The following references are of record in the file of this patent:

UNITED STATES PATENTS

| Number | Name | Date |
|---|---|---|
| 2,293,437 | La Coste | Aug. 18, 1942 |
| 2,355,421 | Clewell | Aug. 8, 1944 |
| 2,377,889 | La Coste | June 12, 1945 |
| 2,383,997 | Sweet | Sept. 4, 1945 |